Figure 1D:
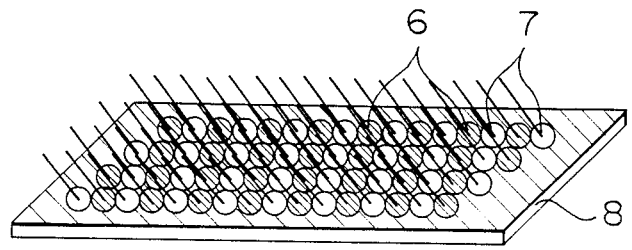

United States Patent [19]

Mino

[11] Patent Number: 4,978,574
[45] Date of Patent: Dec. 18, 1990

[54] FORMATION OF ORGANIC MEMBRANES

[75] Inventor: Norihisa Mino, Settsu, Japan

[73] Assignee: Matsushita Electric Industrial Co., Ltd., Osaka, Japan

[21] Appl. No.: 486,913

[22] Filed: Mar. 1, 1990

[30] Foreign Application Priority Data

Mar. 3, 1989 [JP] Japan ................................ 1-052283

[51] Int. Cl.$^5$ .............................................. B05D 1/20
[52] U.S. Cl. ................................ 428/333; 428/411.1; 118/402; 427/430.1; 427/434.3
[58] Field of Search .................... 118/402; 427/430.1, 427/434.3; 428/333, 411.1

[56] References Cited

U.S. PATENT DOCUMENTS

| | | | |
|---|---|---|---|
| 4,560,599 | 12/1985 | Regen | 427/44 |
| 4,632,800 | 12/1986 | Barraud et al. | 118/402 |
| 4,753,830 | 6/1988 | Matsuda | 427/434.3 |

Primary Examiner—Shrive Beck
Attorney, Agent, or Firm—Stevens, Davis, Miller & Mosher

[57] ABSTRACT

The method of the present invention for forming a monomolecular membrane on a substrate comprises the steps of (1) mixing
   (a) at least one substance having a water-soluble polar head (hydrophilic portion) and a water-insoluble organic tail (hydrophobic portion) in the molecule, the head being ionizable into a cation when spread on water, and
   (b) at least one substance having a water-soluble polar head (hydrophilic portion) and a water-insoluble organic tail (hydrophobic portion) in the molecule, the head being ionizable into an anion when spread on water, to obtain a mixture,
(2) developing the mixture on an aqueous subphase to form a monomolecular layer, and
(3) transferring the monomolecular layer to a substrate while applying a surface pressure to the layer.

According to the present invention, there can be formed a unidimensionally controlled membrane which develops a higher function than do the conventional two-dimensionally controlled membranes. Consequently, the method of the present invention can be applied, for example, to the formation of wiring patterns of a molecular level.

7 Claims, 4 Drawing Sheets

F I G. IA
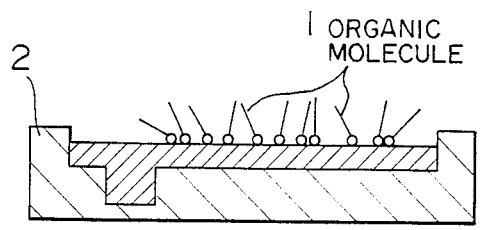
F I G. IB
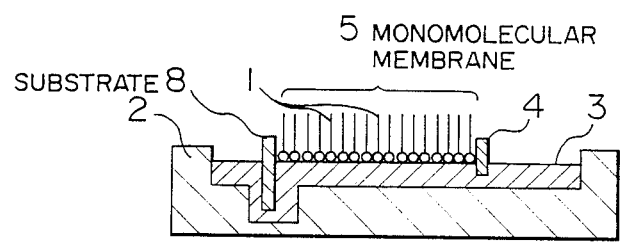
F I G. IC
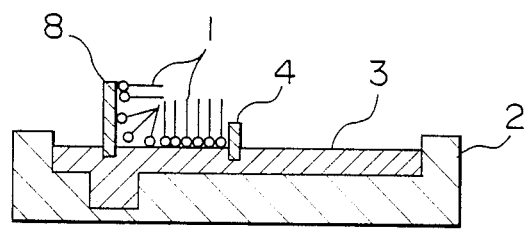

FORMATION OF ORGANIC MEMBRANES

The present invention relates to a method for forming organic membranes widely usable in the field of electronics, etc., and more particularly, to a method for forming monomolecular membranes.

The conventional method for forming monomolecular membranes has been limited to the formation of membranes with one kind of organic molecules.

However, with the conventional method with one kind of organic molecules, the function of the resulting membranes cannot be unidimensionally controlled. It has been impossible, therefore, to provide a membrane having a characteristic function.

For example, when the formation of monomolecular membranes having a function of organic electro-conductivity (e.g. polyacetylene) is aimed at, for example, with only one kind of organic molecules having an acetylene group, there is no limitation at all to the two-dimensional polymerization of the acetylene group. Consequently, the polymerization proceeds in the two-dimensional direction, which results in the formation of a polyacetylene membrane. However, a function required for organic electro-conductivity is a unidimensional electro-conductive function, as is understandable from wiring. In order to create such a function, the direction of polymerization must be controlled.

It is therefore necessary to give some order to the arrangement of molecules constituting the monomolecular membrane.

According to the present invention, there is provided a method for forming a monomolecular membrane on a substrate which comprises the steps of (1) mixing
  (a) at least one substance having a water-soluble polar head (hydrophilic portion) and a water-insoluble organic tail (hydrophobic portion) in the molecule, the head being ionizable into a cation when spread on water, and
  (b) at least one substance having a water-soluble polar head (hydrophilic portion) and a water-insoluble organic tail (hydrophobic portion) in the molecule, the head being ionizable into an anion when spread on water, to obtain a mixture, (2) developing the mixture on an aqueous subphase to form a monomolecular layer, and (3) transferring the monomolecular layer to a substrate while applying a surface pressure to the layer.

Drawings A to D in FIG. 1 and drawings A to E in FIG. 3 are a flow diagram for explaining in order a method for forming organic membranes according to one embodiment of the present invention. FIG. 2 is a drawing for explaining the arrangement of organic molecules in FIG. 1 in more detail.

In the drawings :
1 Organic molecule.
5 Monomolecular membrane.
6 Organic molecule of which the hydrophilic portion is a cation.
7 Organic molecule of which the hydrophilic portion is an anion.
8 Substrate.

The substance (a) used in the method of the present invention is one having a water-soluble polar head (hydrophilic portion) and a water-insoluble organic tail (hydrophobic portion) in the molecule, and the head ionizes into a cation when spread on water.

Specific examples of the hydrophilic portion which ionizes into a cation are $-NR^1R^2R^3X$ (in which $R^1$ to $R^3$ are an alkyl group, and X is halogen), $-NH_2$, etc.

Specific examples of the hydrophobic portion are $CH_3(CH_2)_n$- (in which n is 1 to 25), $C_6H_5$-, $C_6H_{11}$-, $C_{10}H_7$-, $CH_3(CH_2)_n$-⟨⟩-, $(CH_3)_2Si(CH_2)_n$-, etc.

Specific examples of the substance (a) are dimethyldidodecylammonium bromide, dimethyldidodecylammonium chloride, tricoseneamine, etc.

The substance (b) used in the method of the present invention is one having a water-soluble polar head (hydrophilic portion) and a water-insoluble organic tail (hydrophobic portion) in the molecule, and the head ionizes into an anion when spread on water.

Specific examples of the hydrophilic portion which ionizes into an anion are $-SO_3H$, $-OSO_3H$, $-SO_3M$ (in which M is a metal), $-OSO_3M$, $-COOH$, $-COOM$, $-COOOH$, $$-OH,\ -O\overset{O}{\underset{\parallel}{P}}-OH,\ -O\overset{O}{\underset{\mid}{P}}-OH$$
$$\phantom{-OH,\ -O}\underset{O}{\parallel}\phantom{-OH,\ -O}\underset{OR}{}$$

(in which R is an alkyl group), etc.

Specific examples of the hydrophobic portion are the same as in the substance (a).

Specific examples of the substance (b) are didodecyl phosphate, ω-tricosynoic acid, etc.

Each of the substances (a) and (b) may contain plural members.

The substances (a) and (b) may be mixed as they are, or using a solvent. As the solvent, the common organic solvents such as chloroform, dichloroethane, carbon tetrachloride, trichlene, tetrachloroethylene, etc. can be used.

The mixing ratio of the substances (a) and (b) is not critical. As shown by the following examples, a molar ratio of substantially 1:1 is sometimes preferred in order to obtain a unique properties.

An inert third component may be added to the mixture of the substances (a) and (b). It is preferred for the mixture to be uniformly mixed. A mixing means is not critical, and common ones can be used.

The liquid phase for developing the mixture may be any of polar and non-polar ones. The polar liquid are, for example, water, DMF, methanol, ethanol, acetone, THF, pyridine, etc.

When the mixture is developed on the polar liquid, there is obtained a monomolecular layer in which the substances (a) and (b) in the mixture are brought into contact with the liquid phase at their water-soluble polar heads, and their water-insoluble organic tails are arranged at the side of the gaseous phase. In this case, the water-soluble polar heads of the substances (a) and (b) ionize into a cation and an anion, respectively, so that they form a regular arrangement in which the substances (a) and (b) are adjacent to each other by attraction and repulsion between the positive and negative charges.

The non-polar liquid are carbon tetrachloride, trichlene, tetrachloroethylene, n-hexane, benzene, toluene, xylene, kerosene, etc. When the mixture of the substances (a) and (b) is developed on the non-polar liquid phase, there is obtained a monomolecular layer in which the water-soluble polar heads of the substances (a) and (b) are arranged at the side of the gaseous phase, and the water-insoluble organic tails thereof are brought into contact with the liquid phase. Also in this case, a regular arrangement is formed by the actions of attraction and repulsion between charges due to the localized charges of the water-soluble polar heads of the substances (a) and (b).

To the polar liquid phase may be added a substance which can stabilize the ionized polar heads of the substances (a) and (b) by making a pair of the stabilizing substance and the ionized polar head. Such a substance includes for example various metallic ions, Crown ether, chelate compounds, etc.

A method for applying a surface pressure to the monomolecular layer developed on the gas-liquid interface is not critical, and any of the known methods can be used. For example, a method of using a barrier is simple.

A method for transferring the monomolecular layer to which a surface pressure has been applied to a substrate is not critical, and any of the known methods can be used. For example, there are a method of pulling a previously immersed substrate out of the liquid phase, thereby transferring the monomolecular layer on the gas-liquid interface to the substrate, and a method of causing a substrate to contact with the monomolecular layer from the side of the gaseous phase, thereby transferring the layer from the liquid phase to the substrate.

The method of the present invention for forming organic membranes is a method of forming monomolecular membranes using plural organic molecules which can constitute organic membranes, preferably of which the hydrophilic groups belong to either of a cation or an anion.

By forming organic membranes using two or more kinds of organic molecules, it becomes possible to inhibit the two-dimensional polymerization of the molecules, thereby creating a unidimensional function. The polymerization may be conducted before the transferring of the monomolecular layer on the aqueous subphase or may be conducted after the transferring of the monomolecular layer on the substrate.

When the hydrophilic groups of the organic molecules constituting organic membranes comprise a cation and an anion, pairs of the cation and anion are formed at the step of formation of the membranes. The formed monomolecular membrane is transferred to a substrate in a state wherein such pairs are maintained, so that the transferred organic membrane keeps the order of arrangement within the surface.

EXAMPLE 1

A method for forming an organic membrane according to the first embodiment of the present invention is illustrated with reference to FIGS. 1 and 2.

Of two kinds of organic molecules 1 constituting an organic membrane, one organic molecule ionizable into a cation was dimethyldidodecylammonium bromide, and the other organic molecule 7 ionizable into an anion was didodecyl phosphate. These organic molecules 1 were dissolved in a chloroform solvent in a concentration of 1 mg/ml and developed on a water phase 3 which had previously been adjusted to a pH of about 7 in a monomolecular membrane formation apparatus 2 of FIG. 1A. In this case, the numbers of moles of the chemical species in 1 were made almost equal. Thereafter, chloroform was vaporized, and a barrier 4 was moved toward a substrate 8 as shown in FIG. 1B to raise a surface pressure. Thus, a monomolecular membrane 5 was formed on the water phase 3.

The monomolecular membrane 5 formed on the water phase 3 is illustrated in detail. Two kinds of organic molecules 1 developed on the water phase 3 have no order of arrangement in a state wherein no surface pressure is applied thereto. As the surface pressure was increased, two kinds of organic molecules 6 and 7 come to arrange themselves in pairs of the cation and anion as shown in FIG. 2. FIG. 2 is a plan view of the organic molecules 6 and 7 developed on the water phase 3. In the plan view, 6 is dimethyldidodecylammonium bromide which is an organic molecule having a cationic hydrophilic portion, and 7 is didodecyl phosphate which is an organic molecule having an anionic hydrophilic portion.

Figure 2:
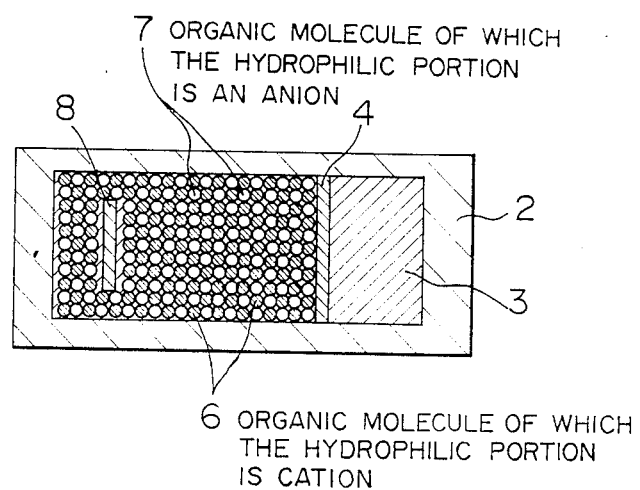

As shown in FIG. 1C, the monomolecular membrane 5 on the water phase 3 was transferred to a substrate 8 by pulling the substrate, previously immersed in the water phase 3, out of the water phase while keeping the surface pressure constant. The monomolecular membrane 5 transferred to the substrate 8 is shown in FIG. 1D. It is seen from this drawing that the arrangement of the organic molecules 6 and 7 constituting the monomolecular membrane 5 is composed of pairs of the cation and anion.

The organic membrane according to the first embodiment of the present invention is formed by the steps described above.

EXAMPLE 2

A method for forming an organic membrane according to the second embodiment of the present invention is illustrated with reference to FIG. 3.

Figure 3A:
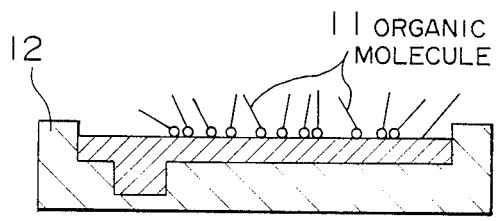
Figure 3B:
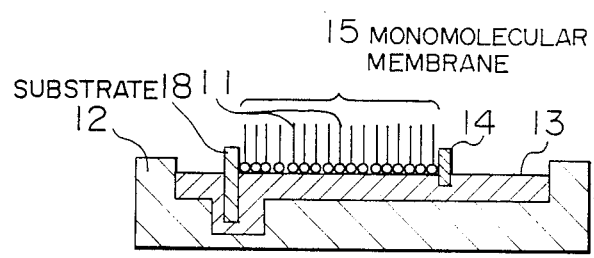

Of two kinds of organic molecules 11 constituting an organic membrane, one organic molecule 16 ionizable into an anion was ω-tricosynoic acid having an acetylene bond in the straight-chain alkyl group, and the other organic molecule 17 ionizable into a cation was tricoseneamine. These organic molecules 16 and 17 were dissolved in chloroform in a concentration of 1 mg/ml and developed on a water phase 13 which had previously been adjusted to a pH of about 7, in a monomolecular membrane formation apparatus 12 of FIG. 3A. In this case, the numbers of moles of the chemical species were made almost equal. Thereafter, the chloroform solvent was vaporized, and a barrier 14 was moved toward a substrate 18 as shown in FIG. 3B to raise a surface pressure. Thus, a monomolecular membrane 15 was formed on the water phase 13.

In the same manner as in Example 1, on applying a surface pressure to the monomolecular membrane 15 formed on the water phase 13, two kinds of organic molecules 16 and 17 arrange themselves in pairs of the cation and anion in the same manner as shown in FIG. 2. As a result, the acetylene bonds, each of which are contained in the straight-chain alkyl group of the organic molecule 16 ionized into an anion, are also arranged alternately.

Figure 3C:
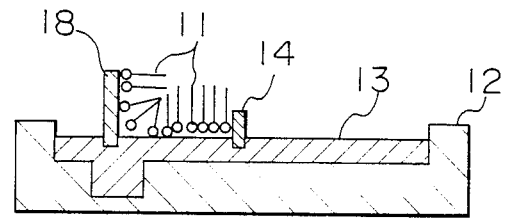
Figure 3D:
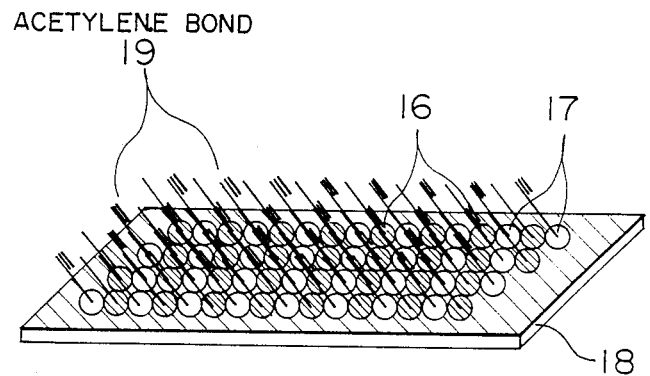

Thereafter, as is shown in FIG. 3C, the barrier 18 immersed in the water phase 13 was pulled up while keeping the surface pressure constant with the barrier 14 to transfer the monomolecular membrane 15 on the water phase 13 to the substrate 18. The monomolecular membrane 15 transferred to the substrate 18 is shown in FIG. 3D. The arrangement of the organic molecules 16 and 17 constituting the monomolecular membrane 15 transferred to the substrate 18 was composed of pairs of the cation and anion. The constitution of this arrangement shows that acetylene bonds 19, each of which is contained in the straightchain alkyl group of the organic molecule 16, were also arranged alternately.

Figure 3E:
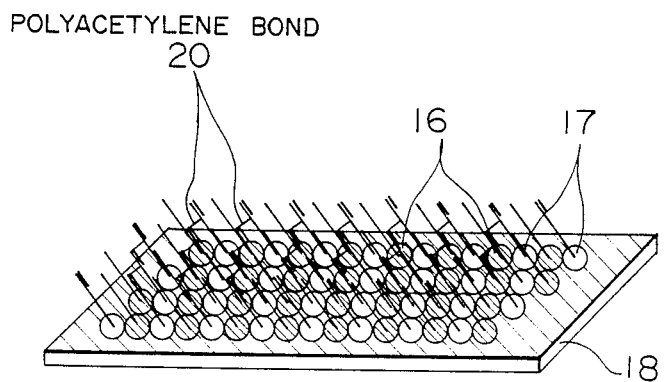

Thereafter, electron-ray irradiation was applied to the monomolecular membrane 15 on the substrate 13. This electron-ray irradiation caused the acetylene bond 19 in the alkyl group to polymerize with the adjacent acetylene group to form a polyacetylene bond 20. In the arrangement of the organic membrane formed according to the present invention, the organic molecules having an acetylene bond were arranged alternately. As a result, the polyacetylene bond is formed only in a direction of about 45° against the edge of the substrate 18. the monomolecular membrane 15 on the substrate after electron-ray irradiation is shown in FIG. 3E. Actually, the measurement of electro-conductive anisotropy of the monomolecular membrane after electron-ray polymerization showed that the anisotropy was about 5. This supports that polyacetylene showing an anisotropy that relates to electro-conductivity was formed. By contrast, the electro-conductive anisotropy was not observed at all when the organic membrane was formed with ω-tricosynoic acid alone, which is an organic molecule having an acetylene bond in the straight-chain alkyl group and being ionizable into an anion, and subjected to electron-ray polymerization to form polyacetylene. This result would demonstrate that the method of the present invention for forming organic membranes produces an organic monomolecular membrane composed of pairs of the cation and anion.

In the examples of the present invention, the organic molecule 1 having a side chain was used, but of course, those which have a straight chain and can form a cation or anion can be used.

Further, in the examples of the present invention, the straight-chain hydrocarbon portion contained an acetylene bond, but of course, it is possible to use those containing other functional groups such as a diacetylene group. In this case, it is also possible to obtain a unidimensional function by using a substance containing a functional group in the molecule between the organic molecules 6 and 7.

Further, in the examples of the present invention, the number of moles of the organic molecule 6 ionizable into a cation and that of the organic molecule 7 ionizable into an anion was substantially equal. However, even when a mixture having a non-equimolar ratio is developed, a monomolecular membrane 5 in which the organic molecules have been distributed in a certain ratio can be formed although distribution of 1:1 pairs cannot be formed.

Still further, in the examples of the present invention, univalent cation and anion were used, but the charges of the cation and anion may be two or more, and may be the same or different each other.

The method of the present invention for forming organic membranes makes it possible to form not only the conventional two-dimensional functional membranes, but also unidimensional ones having functionality such as wiring patterns. Consequently, the method of the present invention may be said to give a large value to the organic functional membrane.

In the conventional methods, the functional group in the hydrophobic portion of the organic molecule was bulky, for example, like anthracene derivatives. So that stable monomolecular membranes could not be produced or high-level arrangement-control was difficult with such the organic molecule alone. Therefore functions such as electro-conductivity were not satisfactory in some cases. In the method of the present invention, however, the hydrophilic portion of the molecule is made one ion (for example, a cation) and the hydrophilic portion of a straight-chain hydrocarbon molecule mixed to promote the high-level arrangement-control is made the other ion (for example, an anion such as arachic acid). By this method, distribution of the both molecules becomes uniform by ionic bonds, so that highly controlled arrangement can be formed. Further, even with molecules which are difficult to form a monomolecular membrane, it becomes possible to form a membrane by employing the method described above.

What is claimed is

1. A method for forming a monomolecular membrane on a substrate which comprises the steps of
   (1) mixing
      (a) at least one substance having a watersoluble polar head (hydrophilic portion) and a waterinsoluble organic tail (hydrophobic portion) in the molecule, the head being ionizable into a cation when spread on water, and
      (b) at least one substance having a watersoluble polar head (hydrophilic portion) and a waterinsoluble organic tail (hydrophobic portion) in the molecule, the head being ionizable into an anion when spread on water, to obtain a mixture,
   (2) developing the mixture on an aqueous subphase to form a monomolecular layer, and
   (3) transferring the monomolecular layer to a substrate while applying a surface pressure on the layer.

2. A method according to claim 1, wherein the step (3) comprises applying a surface pressure with a barrier.

3. A method according to claim 1, wherein the step (3) further comprises polymerizing the monomolecular membrane on the aqueous subphase or on the substrate.

4. A method according to claim 1, wherein the step (1) comprises selecting a molar ratio of the substance (a) to the substance (b) in the mixture of substantially 1:1.

5. A method according to claim 1, wherein the step (1) comprises selecting dimethyldidodecylammonium bromide as the substance (a) and didodecyl phosphate as the substance (b).

6. A method according to claim 1, wherein the step (1) comprises selecting tricoseneamine as the substance (a) and ω-tricosynoic acid as the substance (b).

7. A monomolecular membrane on a substrate obtained by a method according to claim 1.

* * * * *